2,999,052
COMPOSITION FOR COLORIMETRIC TEST FOR SERUM ENZYMES

Harry G. Albaum, Brooklyn, N.Y., and Edward K. Harvill, Elkhart, Ind., assignors to Miles Laboratories, Inc., Elkhart, Ind., a corporation of Indiana
No Drawing. Filed Mar. 16, 1959, Ser. No. 799,464
7 Claims. (Cl. 195—103.5)

This invention relates to a method for the qualitative and quantitative determination of serum enzymes occurring in biological fluids such as cerebro-spinal fluid, blood, urine and the like. Particularly the invention relates to diagnostic compositions useful for the detection of levels of enzymes in biological fluids by a colorimetric procedure wherein the color change is in proportion to the amount of enzyme present in said biological fluid being tested.

In recent years serum enzyme determinations have been found to be increasingly useful in the field of medical research. For example, alkaline phosphatase has been found to be useful in the diagnosis of bone sarcoma. Serum amylase levels are high in cases of acute pancreatitis. Acid phosphatase levels are usually elevated in cases of prostatic cancer. Glutamic oxalacetic transaminase has been found to be elevated following a myocardial infarct. It is to be seen, therefore, that methods for determining levels of such enzymes constitute a very useful tool to the medical practitioner, especially through the clinical diagnostic procedures relied upon.

Methods for measuring some of these serum enzyme levels are known to the art. For example, phosphatase levels, levels of amylase, etc. may be determined by procedures that are well established and are routine in the usual clinical laboratory.

Ordinarily, however, these determinations are extremely complicated and may be accomplished only by skilled biochemical analysts utilizing special apparatus and other delicate equipment.

The object of this invention is to describe simple colorimetric procedures for the detection of certain serum enzymes. These procedures, which are based on a color change may be carried out with the usual laboratory equipment available to all clinical laboratories and by any competent laboratory technician. Thus, the procedure of this invention represents an improvement over existing techniques obviating the necessity for specialized equipment, technique and personnel.

Generally stated, the inventive concept involves the formation of reduced diphosphopyridine nucleotide and the detection of the reduced diphosphopyridine nucleotide by a second enzyme system which comprises diaphorase and a color indicator. In accordance with the procedure of this invention, a change in the color of the dye is a quantitative measure of the level of reduced diphosphopyridine nucleotide, which is in turn either directly or indirectly related to the concentration of the enzyme under study.

The diaphorase used in the second enzyme system may be obtained from animal sources such as liver tissue or heart tissue, from yeast, bacterial sources and the like. The amount of diaphorase used is such as to insure complete oxidation of the reduced diphosphopyridine nucleotide to its oxidized form. It has been found that the diaphorase must be present in excess and when 0.1 ml. serum is used a quantity of 150 units of diaphorase is suitable, a unit being described as that amount of diaphorase which will lead to a decrease in density of 2,6-dichlorindophenol of 0.001 in 1 minute in the presence of an excess of reduced diphosphopyridine nucleotide (0.3 mg./ml. in a final volume of 3.0 ml.).

Diphosphopyridine nucleotide is obtainable from animal tissue such as liver, yeast, etc.

The dye used in the second enzyme system may be selected from the group which has a more positive oxidation-reduction potential than the diphosphopyridine nucleotide-reduced diphosphopyridine nucleotide system (above $-0.282$ $E_o$) and which does not undergo appreciable autoxidation, or whose autoxidation can be controlled. The preferable dye is 2,6-dichlorindophenol. The amount of the dye used will ordinarily vary between about 0.005 and 0.05 mg./ml. of final test solution, with from 0.01 to 0.03 mg. being especially preferred. As was stated above, an excess of diaphorase is used.

A substrate for the "diphosphopyridine nucleotide linked" enzyme is also included in the test composition. It is essential that an excess of this substrate be present and the amount required will depend upon the amount of the enzyme present in the biological fluid being tested.

The test is conducted in a carefully buffered solution, using a buffer of pH 7 and a final volume of 3.0 ml. Phosphate buffer is particularly suitable of a pH of 7 in 0.1 M concentration.

In the testing procedures of this invention, the sample to be tested is thoroughly admixed with the diaphorase, the dye, the diphosphopyridine nucleotide, and the substrate for the enzyme under study, and buffered with the selected buffering solution to a total volume of 3.0 ml. In the presence of the serum enzyme and its substrate, the diphosphopyridine nucleotide is reduced in proportion to the amount of the serum enzyme present. The reduced diphosphopyridine nucleotide in the presence of diaphorase will reduce the dye to its reduced or its leuco form and the color change will be proportional to the amount of the reduced diphosphopyridine nucleotide formed. The total effect, therefore, will be a change in color density which is proportional to the amount of the serum enzyme present.

This decrease in color may be read in a standard colorimeter calibrated for 100% transmission or 0 density at 600 mu. The color change may also be interpreted by comparison with a standardized color chart calibrated to read quantitatively the amount of serum enzyme. The test ingredients may also be used to impregnate a bibulous material such as a paper strip, filter paper, a tablet of cellulose material, etc., and a drop of the biological fluid to be tested contacted therewith. Other modifications of the mechanics of contacting the biological fluid to be tested with the test ingredients will be apparent to those skilled in the art.

It has also been found desirable in all cases to include a minor amount of an albumin material, such as bovine albumin. This material is included for the purpose of stabilizing the system.

Set out in some detail below are specific examples which illustrate the concept of this invention. It is to be understood, of course, that these examples are illustrative only and other embodiments within the purview of this invention will readily become apparent to those skilled in the art.

EXAMPLE I
*Lactic dehydrogenase*

A diagnostic composition for the determination of the enzyme lactic dehydrogenase was prepared comprising the following formulation:

| | Ml. |
|---|---|
| Buffer (potassium phosphate), pH 7.4–0.1 M | 1.3 |
| 2,6-dichlorindophenol (10 mg./100 ml.) | 0.5 |
| Diphosphopyridine nucleotide (40 mg./10 ml.) | 0.6 |
| Sodium lactate (10% solution) | 0.4 |
| Bovine albumin (10 mg./10 ml.) | 0.1 |
| Yeast diaphorase | 0.03 |

When 0.1 ml. blood serum containing lactic dehydrogenase was mixed with the above diagnostic composition, the following results were obtained in the spectrophotometer, set at 600 mu. The changes recorded below may also be observed visually and readings compared with a standardized color chart:

|  | Density at the end of (min.)— | | | | |
|---|---|---|---|---|---|
|  | 2 | 4 | 6 | 8 | 10 |
| Initial Density .743 | .690 | .646 | .590 | .555 | .491 |
| Density Decrease | .053 | .097 | .153 | .188 | .252 |

The density decrease noted measures the decolorization of the dye and is a function of the lactic dehydrogenase activity of the serum.

This reaction proceeds in accordance with the following equation:

(1)

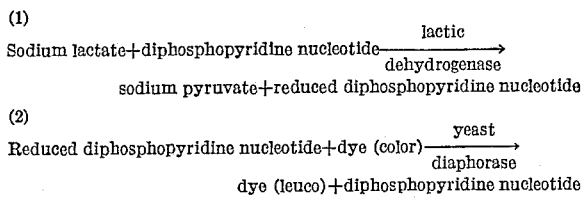

(2)

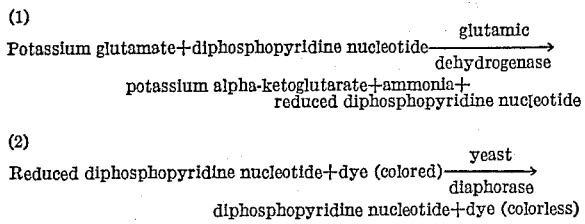

EXAMPLE II

Glutamic dehydrogenase

A diagnostic composition for the detection of glutamic dehydrogenase in body fluids depends upon the following set of reactions:

(1)

Potassium glutamate+diphosphopyridine nucleotide $\xrightarrow{\text{glutamic dehydrogenase}}$
potassium alpha-ketoglutarate+ammonia+ reduced diphosphopyridine nucleotide (2)

Reduced diphosphopyridine nucleotide+dye (colored) $\xrightarrow{\text{yeast diaphorase}}$
diphosphopyridine nucleotide+dye (colorless)

The composition had the following formulation:

|  | Ml. |
|---|---|
| Buffer (potassium phosphate), pH 7.4–0.1 M | 1.4 |
| 2,6-dichlorindophenol (10 mg./100 ml.) | 0.5 |
| Diphosphopyridine nucleotide (40 mg./10 ml.) | 0.6 |
| Glutamic acid (0.2 M in phosphate buffer final pH 7.4) | 0.4 |
| Bovine albumin (10 mg./10 ml.) | 0.1 |
| Yeast diaphorase | 0.03 |

When 0.1 ml. of blood serum containing glutamic dehydrogenase was tested above, the following results were obtained in the spectrophotometer, set at 600 mu. The changes recorded below may also be observed visually and readings compared with a standardized color chart:

|  | Density at the end of (min.)— | | | | |
|---|---|---|---|---|---|
|  | 2 | 4 | 6 | 8 | 10 |
| Initial Density .786 | .729 | .708 | .688 | .672 | .658 |
| Density Decrease | .057 | .078 | .098 | .114 | .128 |

The density decrease noted measures the decolorization of the dye and is a function of the glutamic dehydrogenase activity of the serum.

EXAMPLE III

Malic dehydrogenase

A diagnostic composition for detecting the presence of malic dehydrogenase was prepared having the following formulation:

|  | Ml. |
|---|---|
| Buffer (potassium phosphate), pH 7.4–0.1 M | 1.3 |
| 2,6-dichlorindophenol (10 mg./100 ml.) | 0.5 |
| Diphosphopyridine nucleotide (40 mg./10 ml.) | 0.6 |
| Malic acid (0.2 M in phosphate buffer final pH 7.4) | 0.4 |
| Bovine albumin (10 mg./10 ml.) | 0.1 |
| Yeast diaphorase | 0.03 |

Body fluid (0.1 ml. blood serum) containing malic dehydrogenase was assayed with the formulation set out above and gave the following results in the spectrophotometer, set at 600 mu. The changes recorded below may also be observed visually and readings compared with a standarized color chart:

|  | Density at the end of (min.)— | | | | |
|---|---|---|---|---|---|
|  | 2 | 4 | 6 | 8 | 10 |
| Initial Density .773 | .718 | .669 | .627 | .588 | .555 |
| Density Decrease | .055 | .104 | .146 | .185 | .218 |

The density decrease noted measures the decolorization of the dye and is a function of the malic dehydrogenase activity of the serum.

The reaction proceeded in accordance with the following equations:

(1)

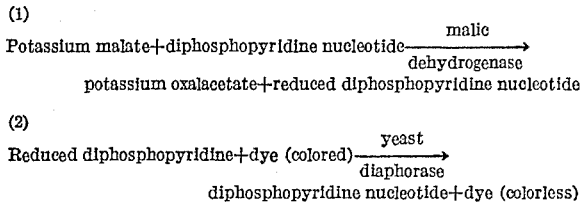

(2)

Reduced diphosphopyridine+dye (colored) $\xrightarrow{\text{yeast diaphorase}}$
diphosphopyridine nucleotide+dye (colorless)

EXAMPLE IV

Glyceraldehyde phosphate dehydrogenase

A diagnostic composition for the detection of the presence of glyceraldehyde phosphate dehydrogenase (GAPDH) in body fluids was prepared. This assay procedure depends upon the following procedure:

(1)

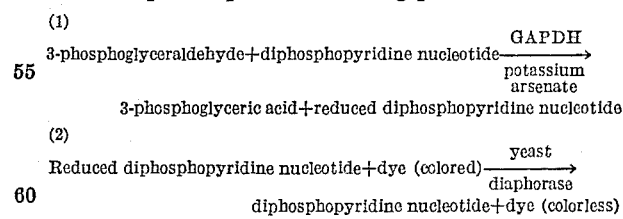

(2)

Reduced diphosphopyridine nucleotide+dye (colored) $\xrightarrow{\text{yeast diaphorase}}$
diphosphopyridine nucleotide+dye (colorless)

The composition had the following formulation:

|  | Ml. |
|---|---|
| Buffer (tris), pH 7.4–0.1 M | 1.7 |
| 2,6-dichlorindophenol (10 mg./100 ml.) | 0.5 |
| Diphosphopyridine nucleotide (40 mg./10 ml.) | 0.4 |
| 3-phosphoglyceraldehyde (0.2 M) | 0.05 |
| Potassium arsenate (0.2 M) | 0.1 |
| Bovine albumin (10 mg./10 ml.) | 0.1 |
| Yeast diaphorase | 0.03 |

When used to assay 0.1 ml. blood serum containing glyceraldehyde phosphate dehydrogenase, the following results were obtained in the spectrophotometer, set at 600 mu. The changes recorded below may also be observed visually and readings compared with a standardized color chart:

|  | Density at the end of (min.)— | | | | |
| --- | --- | --- | --- | --- | --- |
|  | 2 | 5 | 10 | 15 | 20 |
| Initial Density .668 | .599 | .488 | .334 | .214 | .136 |
| Density Decrease | .069 | .180 | .334 | .454 | .532 |

The density decrease noted measures the decolorization of the dye and is a function of the glyceraldehyde phosphate dehydrogenase activity of the serum.

EXAMPLE V

α-Glycerophosphate dehydrogenase

A composition for detecting the presence of α-glycerophosphate dehydrogenase (α-GPDH) in body fluids was prepared according to the following formulation:

|  | Ml. |
| --- | --- |
| Buffer (tris), pH 7.4–0.1 M | 1.5 |
| 2,6-dichlorindophenol (10 mg./100 ml.) | 0.5 |
| Diphosphopyridine nucleotide (40 mg./10 ml.) | 0.4 |
| Sodium α-glycerophosphate (0.25 M) | 0.4 |
| Bovine albumin (10 mg./10 ml.) | 0.1 |
| Yeast diaphorase | 0.03 |

This assay procedure depends upon the following reactions:

(1)
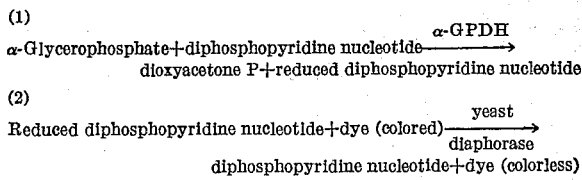
α-Glycerophosphate+diphosphopyridine nucleotide →(α-GPDH)→ dioxyacetone P+reduced diphosphopyridine nucleotide (2)
Reduced diphosphopyridine nucleotide+dye (colored) →(yeast diaphorase)→ diphosphopyridine nucleotide+dye (colorless)

When used to assay 0.1 M blood serum containing α-glycerophosphate dehydrogenase, the following results were obtained in the spectrophotometer, set at 600 mµ. The changes recorded below may also be observed visually and readings compared with a standardized color chart:

|  | Density at the end of (min.)— | | | | |
| --- | --- | --- | --- | --- | --- |
|  | 5 | 10 | 15 | 20 | 25 |
| Initial Density .657 | .653 | .648 | .642 | .638 | .632 |
| Density Decrease | .004 | .009 | .015 | .019 | .025 |

The density decrease noted measures the decolorization of the dye and is a function of the α-glycerophosphate dehydrogenase activity of the serum.

To reiterate briefly, this invention comprises a method for the determination of enzymes in biological fluids which have been found to have medical significance and to compositions which are useful in such testing procedures. The test procedures and the composition therefor in all instances depends upon the change of color density resulting when reduced diphosphopyridine nucleotide, in the presence of diaphorase, contacts a dye whose oxidation-reduction potential is above about −0.282 $E_o$ or which has a more positive oxidation-reduction potential that the diphosphopyridine nucleotide-reduced diphosphopyridine nucleotide system. The composition comprises a substrate for the enzyme under study, diphosphopyridine nucleotide, diaphorase, and a color indicator, the system being buffered to a pH of 7.

What is claimed is:

1. A composition for the detection of diphosphopyridine nucleotide linked enzymes in biological fluids which comprises a substrate for said enzyme, diphosphopyridine nucleotide, diaphorase, a color indicator having an oxidation-reduction potential above that of the diphosphopyridine nucleotide-reduced diphosphopyridine nucleotide system and which is not subject to autoxidation, said composition being buffered to a pH of about 7.

2. A composition in accordance with claim 1, wherein said color indicator is 2,6-dichlorindophenol.

3. A composition for the detection of lactic dehydrogenase in biological fluids which comprises in combination a salt of lactic acid, diphosphopyridine nucleotide, diaphorase, and 2,6-dichlorindophenol, said composition being buffered to pH of about 7.

4. A composition for the detection of glutamic dehydrogenase in biological fluids which comprises a salt of glutamic acid, diphosphopyridine nucleotide, diaphorase and 2,6-dichlorindophenol, said composition being buffered to a pH of about 7.

5. A composition for the detection of malic dehydrogenase which comprises a salt of malic acid, diphosphopyridine nucleotide, diaphorase and 2,6-dichlorindophenol, said composition being buffered to a pH of about 7.

6. A composition for the detection of glyceraldehyde phosphate dehydrogenase in biological fluids which comprises a salt of arsenic acid, 3-phosphoglyceraldehyde, diphosphopyridine nucleotide, diaphorase and 2,6-dichlorindophenol, said composition being buffered to a pH of about 7.

7. A composition for the detection of α-glycerophosphate dehydrogenase in biological fluids which comprises a salt of α-glycerophosphate in phosphoric acid, diphosphopyridine nucleotide, diaphorase and 2,6-dichlorindophenol, said composition being buffered to a pH of about 7.

References Cited in the file of this patent

UNITED STATES PATENTS 2,359,052   Scharer _____ Sept. 26, 1944

FOREIGN PATENTS 203,451   Australia _____ Sept. 27, 1956

OTHER REFERENCES

"Enzymes," by Dixon et al., pp. 199 and 403, 1958, published by Academic Press Inc., New York.

"Outlines of Enzyme Chemistry," by Neilands et al., 1958, 2nd edition, page 391, published by John Wiley & Sons, Inc., New York.